Oct. 5, 1943. G. G. LUNDBLAD 2,331,210
FISHING REEL
Filed Nov. 15, 1941
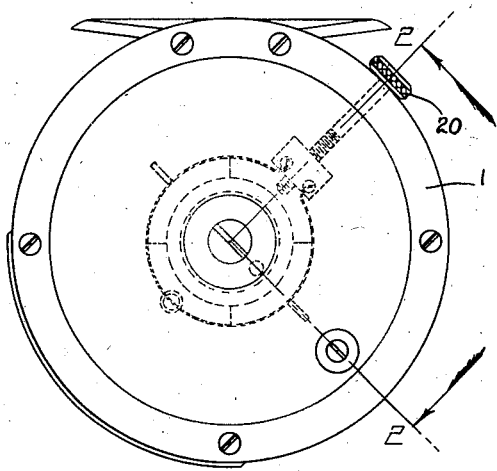
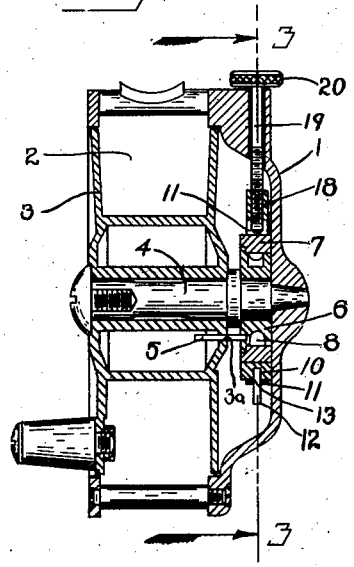
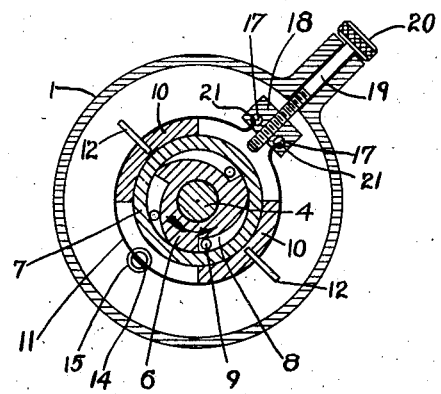
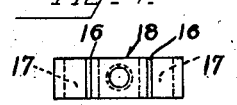
INVENTOR
Gustave G. Lundblad
By
ATTORNEY Patented Oct. 5, 1943

2,331,210

UNITED STATES PATENT OFFICE 2,331,210

FISHING REEL

Gustave G. Lundblad, Bristol, Conn., assignor to The Horton Manufacturing Company, a corporation of Connecticut Application November 15, 1941, Serial No. 419,299

10 Claims. (Cl. 242—84.5)

My invention relates to fishing reels.

It has among its objects to provide an improved fly reel of the silent type. A further object of my invention is to provide an improved brake controlling mechanism of the type described and claimed in a copending application of William I. Treadway, Serial No. 419,307, filed November 15, 1941, whereby the operation of this mechanism is improved and rendered more quickly responsive under all conditions. A still further object of my invention is to provide improved braking mechanism including a plurality of brake members and improved spring means for applying pressure on said brake members, as well as improved means for mounting the brake members and the spring and for adjusting the tension of the latter, all whereby the braking pressure is applied in an improved manner equally to the braking members and an improved floating effect of the braking member and spring is made possible. These and other objects and advantages of my improvements will, however, hereinafter more fully appear.

In the accompanying drawing, I have shown for purposes of illustration one embodiment which my invention may assume in practice when embodied in a left hand reel.

In this drawing,

Figure 1 is a side elevation of a reel equipped with my improvements, certain parts being shown in dotted lines to facilitate illustration;

Fig. 2 is a section on line 2—2 of Figure 1;

Fig. 3 is a section on line 3—3 of Figure 2, and

Fig. 4 is a detail plan view of the adjusting unit.

In this illustrative construction, I have shown a reel of the type described and claimed in application Serial No. 419,307 and including a reel casing 1 having a spool aperture 2 therein and a spool 3 rotatable in said aperture on a usual post 4 and connected through a hole 3a, with a laterally projecting driving pin 5 carried on an inner clutch ring 6, so that as the spool 3 is rotated in one direction, the ring 6 will rotate freely while, when the spool 3 and ring 6 are rotated in the opposite direction, the latter will be clutched to and also rotate an outer normally braked ring 7; my present invention including an improved form of clutch mechanism between the rings 6 and 7, and an improved arrangement and construction of braking mechanism acting upon the outer ring 7.

Referring more particularly to the clutch mechanism, it will be noted that instead of as heretofore providing a single short eccentric groove 8 in the periphery of the inner ring member 6 and a single ball 9 therein permitting free rotation of the ring 6 in one direction of rotation of the spool 3 and connecting the ring 6 to the brake ring 7 when the spool is rotated in the opposite direction, I herein provide an improved overrunning clutch construction whereby the clutch is immediately operative in all angular positions of the spool. As shown, a series of such eccentric grooves is provided spaced equally around the periphery of the ring 6 with a ball 9 in each ring, three such grooves and balls being illustrated.

Referring more particularly to the braking mechanism, it will be noted that the same herein includes a pair of braking members or shoes 10 diametrically opposite and each extending over a like substantial length of the outer surface of the outer ring 7. As shown, these members 10 are also operated in an improved manner by a plate spring 11 extending around the ring 7 outside the members 10; pins 12 fixed in the members 10 extending outward through and being reciprocable freely in corresponding holes 13 in the spring 11 in such manner as to cause both members 10 to be positioned longitudinally relative to the spring while being compressed thereby against the periphery of the ring 7 when the spring is contracted. As shown, the spring 11, midway between its ends, is also passed freely through a transverse slot 14 in a stud or rivet 15 carried on the adjacent wall of the casing so that the spring may float in this slot. The free ends of the spring, herein at a point diametrically opposite the stud or rivet 15, are also extended through suitable slots into holes 17 in opposite ends of a rectangular adjusting nut 18 threaded on an adjusting screw 19 in turn having a knurled operating end 20 adjustable from the exterior of the casing 1. Attention is also directed to the fact that the extremities of the spring 10 are hooked, as shown at 21, in such manner as thereby to be readily connected to and removable from the nut 18, while the tension of the spring is adjustable as the nut is adjusted upon rotation of the adjusting screw 19.

In the operation of my improved construction, it will be apparent that the balls 9 being movable by gravity, one of the same is always in a position to connect the members 6 and 7 instantly upon a reversal in direction of rotation of the spool 3 and consequently of the ring 6; the left hand ball 9 being shown in such position in Figure 3. Further, it will be evident that the two diametrically opposite brake members 10 will be acted upon by the spring 11 in such manner that an equal pressure is exerted by the spring on each member 10 as a result of contraction of the spring and resultant compression of the members 10.

As a result of my improved construction, due to the provision of the pins 12 extending through the holes 13 in the spring 11, it will also be evident that at the same time that the members 10 are positioned by the spring, these members are allowed to float, while the slot 14 in the rivet 15 also enables the spring to float relative to this rivet. Thus, while the ring 6 will rotate freely during reeling in rotation of the spool 3, when the direction of the latter is reversed, a balanced and equal pressure will be instantly applied to each of the members 10 carried by and adjustable with the floating spring 11. Further, by adjustment of the knurled end 20, the hooked ends of the spring being connected in the holes 17 in the nut 18, the adjustment of the tension of the spring may be varied as desired.

While I have herein specifically described one embodiment which my invention may assume in practice, it will be understod that this form is shown for purposes of illustration, and that the invention may be modified and embodied in other forms without departing from its spirit or the scope of the appended claims.

What I claim as new and desire to secure by Letters Patent is:

1. In a fishing reel, a spool, clutch mechanism including a driving member driven by said spool, a driven member, and clutch means disconnecting said members when said spool is rotated in one direction for automatically connecting the same upon reverse rotation of said spool, a plurality of brake members for said driven member, and means constantly acting on said brake members for applying pressure thereon including a plate spring disposed around said driven member and pressing said brake members thereon.

2. In a fishing reel, a spool, a driving member driven by said spool, a driven member, means normally disconnecting said member when said spool is rotated in one direction for automatically connecting the same upon reverse rotation of said spool, a plurality of brake members for said driven member, and spring means for applying pressure on said brake members including a plate spring extending around said driven member, and a floating mounting for said spring.

3. In a fishing reel, a spool, a driving member driven by said spool, a driven member, means normally disconnecting said members when said spool is rotated in one direction for automatically connecting the same upon reverse rotation of said spool, a plurality of brake members for said driven member, and spring means constantly applying pressure on said brake members including a plate spring extending around said driven member, a floating mounting for said spring, and floating mountings between said brake members and said spring.

4. In a fishing reel, a fixed spool carrying post, a spool rotatable thereon, a member to be braked, clutch means whereby said member is rotatable with said spool in one direction of spool rotation and disconnected therefrom during rotation in the opposite direction, a plurality of brake members acting on said member to be braked, and spring means for applying balanced and equal pressures on said brake members including a plate spring extending around said member to be braked and acting on said brake members.

5. In a fishing reel, a spool, a member to be braked rotatable with said spool in one direction of spool rotation, a plurality of brake members for said member to be braked, and spring means for applying pressure on said brake members including a plate spring extending around said member to be braked and acting on said brake members, and floating mountings for said brake members on said spring.

6. In a fishing reel, a spool, a member to be braked rotatable with said spool in one direction of spool rotation, a plurality of brake members for said member to be braked, and spring means for applying pressure on said brake members including a plate spring extending around said member to be braked and acting on said brake members, and a floating mounting for said spring including a spring support having a slot through which a portion of the spring intermediate said brake members is freely movable.

7. In a fishing reel, a spool, a member to be braked rotatable with said spool in one direction of spool rotation, a plurality of brake members for said member to be braked, and spring means for applying pressure on said brake members including a plate spring extending around said member to be braked and acting on said brake members and having adjacent free ends, and spring tension adjusting means connected to said ends.

8. In a fishing reel, a spool, a member to be braked rotatable with said spool in one direction of spool rotation, a plurality of brake members for said member to be braked, and spring means for applying pressure on said brake members including a plate spring extending around said member to be braked and acting on said brake members, a support for said spring between said brake members, and tension adjusting means for said spring connected to the free ends thereof diametrically opposite said support.

9. In a fishing reel, a spool, a member to be braked rotatable with said spool in one direction of spool rotation, a plurality of brake members for said member to be braked, and spring means for applying pressure on said brake members including a plate spring extending around said member to be braked and acting on said brake members, a support for said spring between said brake members, and tension adjusting means for said spring connected to the free ends thereof diametrically opposite said support, said spring having hooked free ends and said tension adjusting means including an adjusting nut having slotted portions receiving and connecting said hooked ends to said nut.

10. In a fishing reel, the combination of a rotating spool, a mounting therefor, an inner ring rotatable about the spool axis and driven by the spool, an outer ring, a one-way silent clutch between the rings, an encircling spring about the outer ring, and separate spaced brake members held against the outer periphery of the outer ring at different points by said spring.

GUSTAVE G. LUNDBLAD.